United States Patent [19]

Dessale et al.

[11] Patent Number: 5,755,092
[45] Date of Patent: May 26, 1998

[54] EXHAUST NOZZLE MIXER FOR A TURBOFAN ENGINE

[75] Inventors: Bruno Filbert Dessale, Grandpuits; Jean-Luc Gérard Duparcq, Vaux le Penil; Hugues Denis Joubert, Charenton, all of France

[73] Assignee: Societe Nationale d'Etude et de Construction de Moteurs d'Aviation (S.N.E.C.M.A), Paris Cedex, France

[21] Appl. No.: 732,926

[22] Filed: Oct. 17, 1996

[30] Foreign Application Priority Data

Oct. 18, 1995 [FR] France .................... 95 12205

[51] Int. Cl.$^6$ .................... F02K 1/48; F02K 3/04
[52] U.S. Cl. .................... 60/262; 60/39.31
[58] Field of Search .................... 60/39.31, 226.1, 60/262; 244/54

[56] References Cited

U.S. PATENT DOCUMENTS

| | | |
|---|---|---|
| 4,238,092 | 12/1980 | Brennan . |
| 4,712,750 | 12/1987 | Ridgwell . |
| 4,813,230 | 3/1989 | Braithwaite . |
| 5,216,879 | 6/1993 | Zysmann .................... 60/262 |
| 5,265,807 | 11/1993 | Steckbeck et al. . |
| 5,444,912 | 8/1995 | Folmer . |
| 5,524,847 | 6/1996 | Brodell et al. .................... 244/54 |

FOREIGN PATENT DOCUMENTS

| | | |
|---|---|---|
| 2 082 259 | 3/1982 | United Kingdom . |
| 2 112 077 | 7/1983 | United Kingdom . |
| 2 146 702 | 4/1985 | United Kingdom . |

*Primary Examiner*—Louis J. Casaregola
*Attorney, Agent, or Firm*—Bacon & Thomas

[57] ABSTRACT

An exhaust nozzle mixer for a turbojet engine is disclosed having a multi-lobed shroud extending from the exhaust nozzle of the turbojet engine, the shroud having a plurality of radially oriented lobes forming a plurality of gas mixing channels, each having a first cross-section in a plane extending substantially perpendicular to the longitudinal axis of the engine, as well as a flared lobe having a greater circumferential width than the remainder of the lobes to accommodate the engine mounting pylon. A baffle member extends radially inwardly from the mounting pylon toward the longitudinal axis of the engine such that the baffle extends into the flared lobe to form a plurality of cross-sections, each of such cross-sections being generally equal to each of remainder of the cross-sections of the multi-lobed shroud.

4 Claims, 3 Drawing Sheets

EXHAUST NOZZLE MIXER FOR A TURBOFAN ENGINE

BACKGROUND OF THE INVENTION

The present invention relates to an exhaust nozzle mixer for a turbojet engine, more particularly such a mixer for a turbojet engine mounted on a pylon attached to an aircraft structure.

Turbojet engines, whether single-jet engines, or mixed-jet turbojet engines, generate high noise levels which increases directly in proportion with the rate of the exhaust gas flow. The need to reduce aircraft noise near airports and when operating at low and average altitudes entails fitting the turbojet engines with apparatus for lowering the exhaust gas noise. The gas flow noise level is lowered by increasing the contact surface between the hot and cold gases in order to improve dilution and to lower the exhaust gas flow rate. The designs of such apparatus must be such as to avoid unduly large aerodynamic interference with the gas flows which would lower the efficiency of the engine.

Known devices for reducing engine noise comprise daisy wheel organ pipes, multi-lobed organ pipes or a combination of these devices. The devices may have a plurality of lobes having a daisy-like appearance when viewed from the rear end of the device.

SUMMARY OF THE INVENTION

An exhaust nozzle mixer for a turbojet engine is disclosed having a multi-lobed shroud extending from the exhaust nozzle of the turbojet engine, the shroud having a plurality of radially oriented lobes forming a plurality of gas mixing channels, each having a first cross-section in a plane extending substantially perpendicular to the longitudinal axis of the engine, as well as a flared lobe having a greater circumferential width than the remainder of the lobes to accommodate the engine mounting pylon. A baffle member extends radially inwardly from the mounting pylon toward the longitudinal axis of the engine such that the baffle extends into the flared lobe to form a plurality of cross-sections, each of such cross-sections being generally equal to each of the remainder of the cross-sections of the multi-lobed shroud.

The baffle member may extend rearwardly of the multi-lobed shroud and may either be formed as a separate element and attached to the mounting pylon, or may be formed integrally with the mounting pylon.

In a mixed-jet turbojet engine, such as a turbofan, an annular casing separates the cold gas flow generated by the turbo-fan from an inner, annular flow of hot gases through the jet engine. The multi-lobed shroud mixer is attached to the downstream end of the annular casing to enhance the mixing of the hot and cold gas flows in the exhaust nozzle in order to lower the exhaust gas flow rate and, consequently, to lower the noise generated by the gas flow. The shroud has circumferentially alternating inner and outer lobes, the inner lobes feeding cold air toward the nozzle longitudinal axis and the outer lobes feeding the hot gases towards the outside within the cold flow path.

When the turbojet engine is supported from an aircraft structure by a pylon attached to the casing and to the aircraft, the mounting pylon extends into the cold gas flow and the mixer must have a flared lobe with a greater circumferential dimension than the remaining lobes to accommodate the mounting pylon. Accordingly, the circumferential distribution of the gas mixture is non-homogeneous at the mixer outlet due to the presence of this flared lobe and the portion of the pylon extending downstream.

The object of the present invention is to improve the mixture of hot and cold gas flows in the exhaust nozzle in the zone adjacent to the mounting pylon in order to achieve a gain in thrust and a reduction in the noise level. This object is achieved by a baffle located on the bottom of the pylon and extending into the flared lobe towards the longitudinal axis of engine to reduce the cross section of the hot gas channel in the flared lobe to enhance mixing of the two gas flows downstream of the mixture, while at the same time avoiding excess aerodynamic interference with the gas flow. In a first embodiment, the baffle member consists of a flared body affixed to the mounting pylon downstream of the mixer. This design can be used in newly manufactured mounting pylons, and may be retrofitted to existing mounting pylons. In a second embodiment of the invention, the baffle is formed integrally with the bottom of the mounting pylon to extend into the flared lobe of the mixer. This design may be used in newly manufactured structures so as to provide minimal interference with the aerodynamic contour of the mounting pylon.

The invention relates to a turbojet engine comprising an annular casing separating an external flow of cold gas from the turbojet-fan from an inner annular flow of hot turbine gases from the jet engine, and a multi-lobed mixer mounted coaxially with the hot gas flow at the downstream end of the casing. The mixer is designed to enhance the mixing of the two gas flows. The turbojet engine is supported by a mounting pylon which is affixed to the casing.

DETAILED DESCRIPTION OF THE PREFERRED EMBODIMENTS

Figure 1:
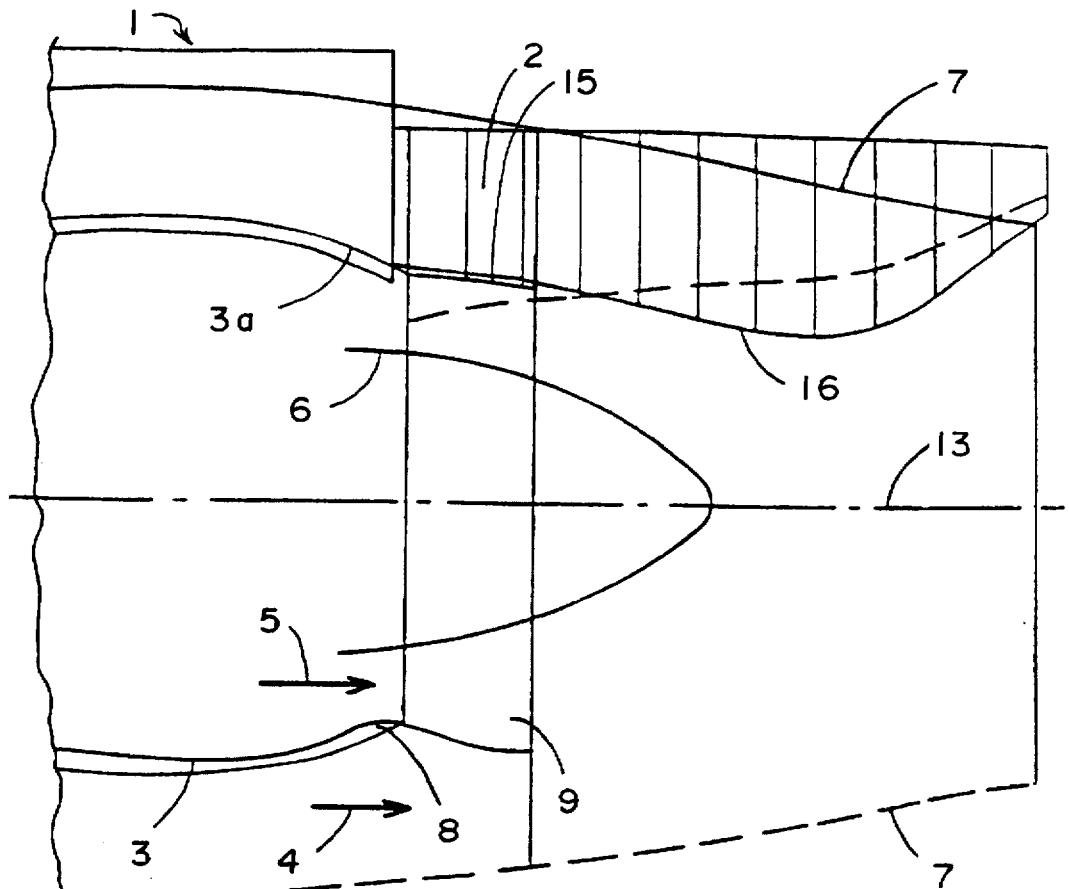
FIG. 1 is a cross-sectional view of the rear portion of a turbofan jet engine fitted with a conventional convoluted lobed mixer and suspended from a mounting pylon.

FIG. 1 illustrates a rear portion of a turbojet engine 1 mounted on a mounting pylon 2 which is also attached to the wing (not shown) of an aircraft. The turbojet engine 1 comprises a main casing 3 separating external cold air flow 4 from an inner annular flow of hot gases 5 issuing from the turbine of the jet engine. The exhaust cone of the jet engine is illustrated at 6.

In order to mix the two gas flows 4 and 5 in the exhaust nozzle 7 to reduce the noise produced by the jet engine, a generally annular, convoluted, multi-lobed mixer 9 is mounted at the downstream end 8 of the casing 3. The mixer 9 has alternating inner and outer lobes 10 and 11, respectively, such that the inner lobes 10 define an external channel 12 extending toward the turbojet engine longitudinal axis 13 and toward the rear (towards the right as illustrated in FIG. 1) such that they direct a portion of the cold flow 4 towards the center of the exhaust jet. The outer lobes 11 define inner channels 14 running towards the rear of the turbojet engine 1 and radially outwardly such that they direct a portion of the hot flow gas 5 towards the peripheral zones of the exhaust jet.

The main casing 3 is attached to the mounting pylon 2 at an upper portion 3a. The mixer 9 has a flared lobe 15 in an upper zone, the flared lobe 15 having a greater circumferential dimension than the remaining lobes in order to accommodate the mounting pylon 2. The contour of the flared lobe 15 runs substantially parallel to the longitudinal axis 13 of the turbojet engine 1. The longitudinal contour of the mounting pylon 2 downstream of the mixer 9 in the exhaust nozzle 7 is illustrated at 16. The contour 16 mergers, without inflection, into the contour of the flared lobe 15.

Figure 2:
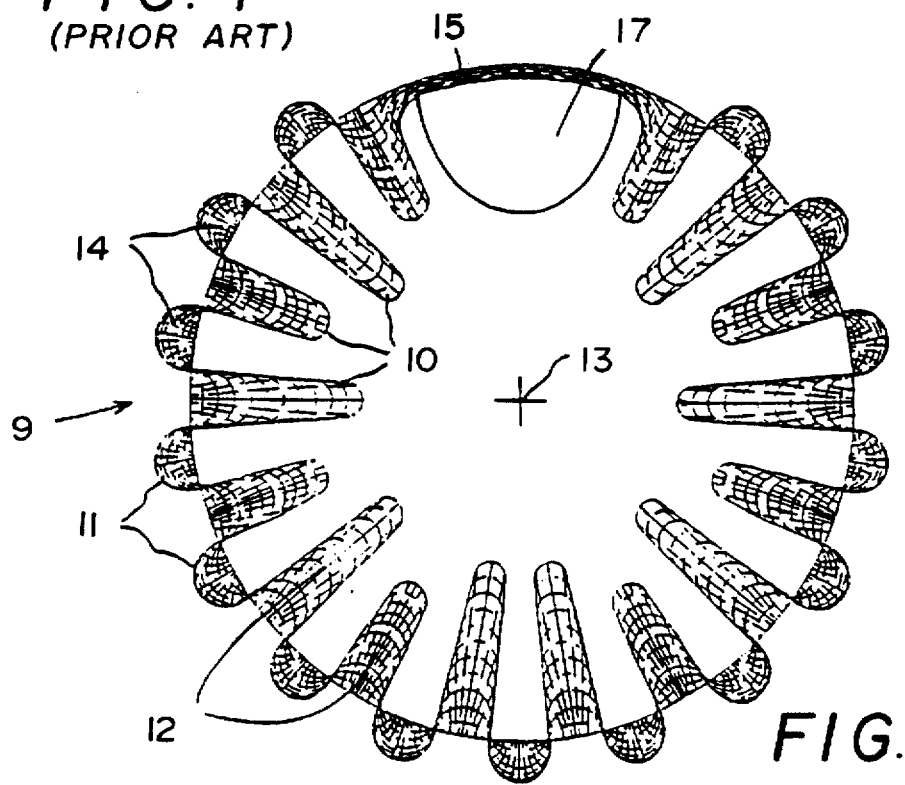
FIG. 2 is a rear view of the multi-lobed mixer of FIG. 1.

To improve the homogeneity of the mixture of the gas flows 4 and 5, and to thereby reduce the gas flow speeds out the outlet of the nozzle 7 thereby lowering engine noise level, the present invention provides a baffle member 17 extending downstream of the flared lobe 15 and located in the flow of the hot gases 5 as illustrated in FIG. 2.

Figure 3:
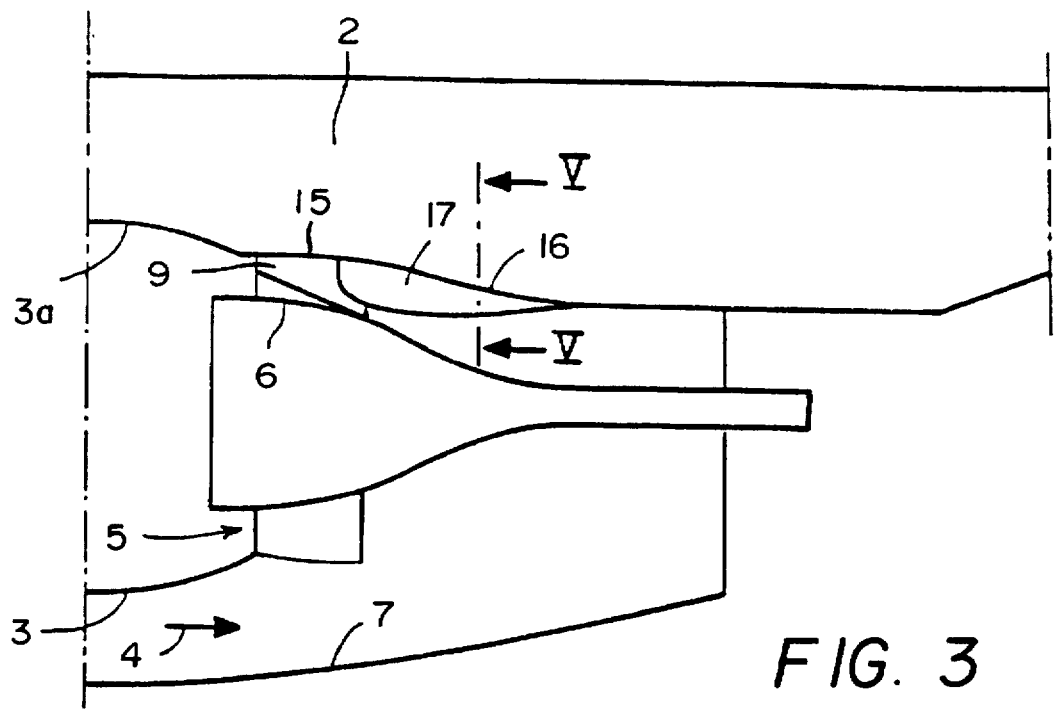
FIG. 3 is a schematic, cross-sectional view of a first embodiment of the present invention.
Figure 5:
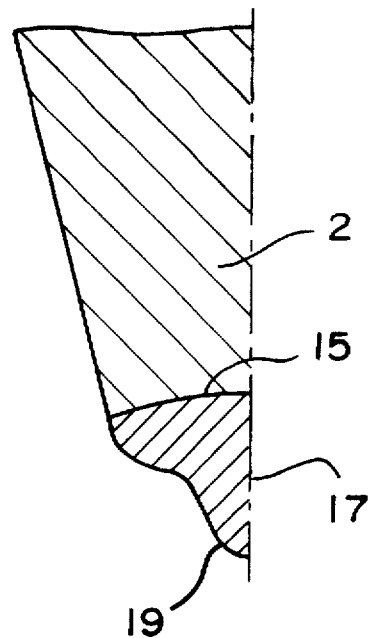
FIG. 5 is a cross-sectional view taken along line V—V in FIG. 3.

In a first embodiment illustrated in FIGS. 3 and 5, the baffle member 17 comprises a flared body affixed underneath the mounting pylon 2 and having a longitudinal contour similar to that of the mounting pylon illustrated in FIG. 1. The baffle member 19 partly occupies the volume bounded by the flared lobe 15 in order to reduce the cross-section of the hot gases 5 in this zone to a value approximating that of each of the remaining lobes of the mixer. This embodiment is applicable both to newly manufactured mounting pylon structures and may also be retrofitted to existing mounting pylons. As shown, the baffle member 17 rests against a lower side of the flared lobe 15. Reference numeral 19 denotes the contour of the baffle member at the outlet of the mixer 9.

Figure 4:
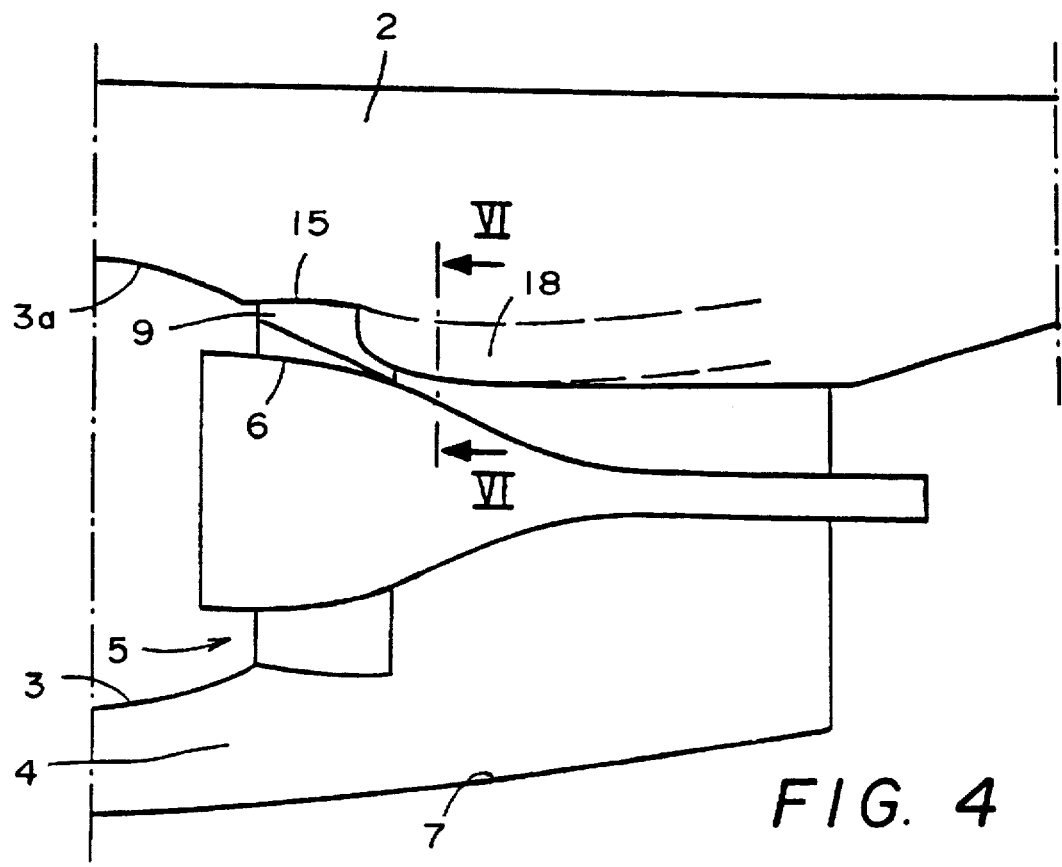
FIG. 4 is a view similar to FIG. 3, but illustrating a second embodiment of the present invention.
Figure 6:
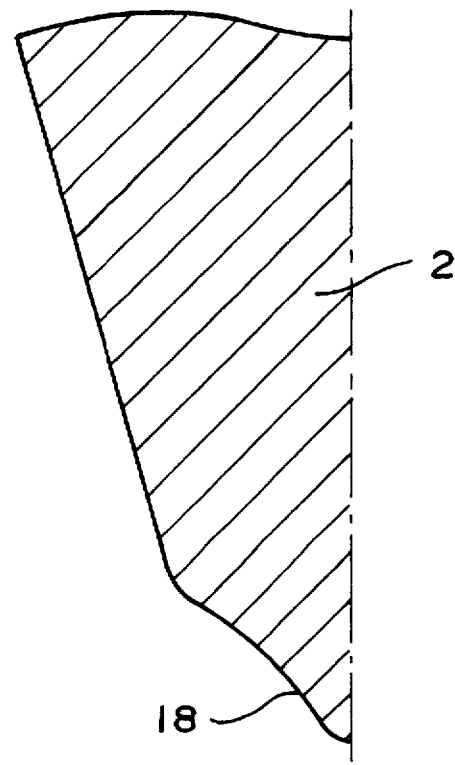
FIG. 6 is a cross-sectional view taken along line VI—VI in FIG. 4.

In a second embodiment illustrated in FIGS. 4 and 6, the baffle member is integrally incorporated into the aerodynamic contour of the mounting pylon 2. In such a case, the mounting pylon 2 includes a protrusion 18 extending into the flared lobe 15 of the mixer 9 to reduce the channel flow cross-section of the hot gases 5, taken at right angles to the mounting pylon 2, to enhance the mixing of the flows 4 and 5 downstream of the mixer 9. Since, in this embodiment, the baffle member is formed integrally with the mounting pylon 2, it is possible to assure minimal aerodynamic interference with the gas flows around the contours of the mounting pylon 2.

The foregoing description is provided for illustrative purposes only and should not be construed as in any way limiting this invention, the scope of which is defined solely by the appended claims.

We claim:

1. An exhaust nozzle mixer for a turbofan engine having a longitudinal axis, an exhaust nozzle, a mounting pylon, and a multi-lobed shroud having a plurality of radially oriented lobes forming a plurality of gas mixing channels each having a first cross-sectional area in a plane extending substantially perpendicular to the longitudinal axis and a flared lobe having a second cross-sectional area greater than the first cross-sectional area to accommodate the mounting pylon, the nozzle mixer comprising:

a baffle member extending radially inwardly from the mounting pylon toward the longitudinal axis, the baffle member extending into the flared lobe so as to divide the second cross-sectional area into a plurality of third cross-sectional areas whereby each third cross-sectional area is generally equal to one of the plurality of the first cross-sectional areas.

2. The exhaust nozzle mixer of claim 1 wherein the baffle member extends rearwardly of the multi-lobed shroud.

3. The exhaust nozzle mixer of claim 1 wherein the baffle member comprises a separate member attached to the mounting pylon.

4. The exhaust nozzle mixer of claim 1 wherein the baffle member is formed integrally with the mounting pylon.

* * * * *

UNITED STATES PATENT AND TRADEMARK OFFICE
CERTIFICATE OF CORRECTION

PATENT NO. : 5,755,092
DATED : May 26, 1998
INVENTOR(S) : DESSALE et al.

It is certified that error appears in the above-indentified patent and that said Letters Patent is hereby corrected as shown below:

Column 3:

Line 18, "flared" should read --faired--.

Line 21, "19" should read --17--

Signed and Sealed this

Eighth Day of June, 1999

Attest:

Q. TODD DICKINSON

*Attesting Officer*     Acting Commissioner of Patents and Trademarks